United States Patent [19]

Jaworek

[11] 3,787,317

[45] Jan. 22, 1974

[54] PROCESS FOR THE CHROMATOGRAPHIC SEPARATION OF MIXTURES

[75] Inventor: Dieter Jaworek, Tutzing/Obb, Germany

[73] Assignee: Boehringer Mannheim GmbH, Mannheim, Germany

[22] Filed: Apr. 15, 1971

[21] Appl. No.: 134,256

[30] Foreign Application Priority Data
Apr. 28, 1970 Germany.................. P 20 20 789.0

[52] U.S. Cl. .............................. 210/31 C, 210/502
[51] Int. Cl. ........................................... B01d 15/08
[58] Field of Search...... 210/31 C, 198 C, 502, 503; 55/67, 197, 386

[56] References Cited
UNITED STATES PATENTS

| 3,069,897 | 12/1962 | Sanford.................................. 55/67 |
| 3,263,488 | 8/1964 | Martin ................................ 55/67 X |
| 2,911,362 | 11/1959 | Wheaton........................... 210/31 C |
| 3,536,614 | 10/1970 | Frisque et al..................... 210/31 C |
| 3,502,545 | 3/1970 | Westman et al. ............. 210/31 C X |

Primary Examiner—John Adee
Attorney, Agent, or Firm—Burgess, Dinklage & Sprung

[57] ABSTRACT

Mixtures of substances are resolved into their components by use of molecular sieve and/or ion exchangers wherein at least two different molecular sieve chromatographic separation materials, and optionally an ion exchange chromatographic separation material; are arranged directly behind one another, at least one ion exchange material and/or molecular sieve material being followed by at least one molecular sieve material. Examples of materials separated are dextran blue (A), catalase (B), haemoglobin (C), chymotrypsin (D), cytochrome C (E), and dinitrophenyl-asparaginic acid (F).

13 Claims, 7 Drawing Figures

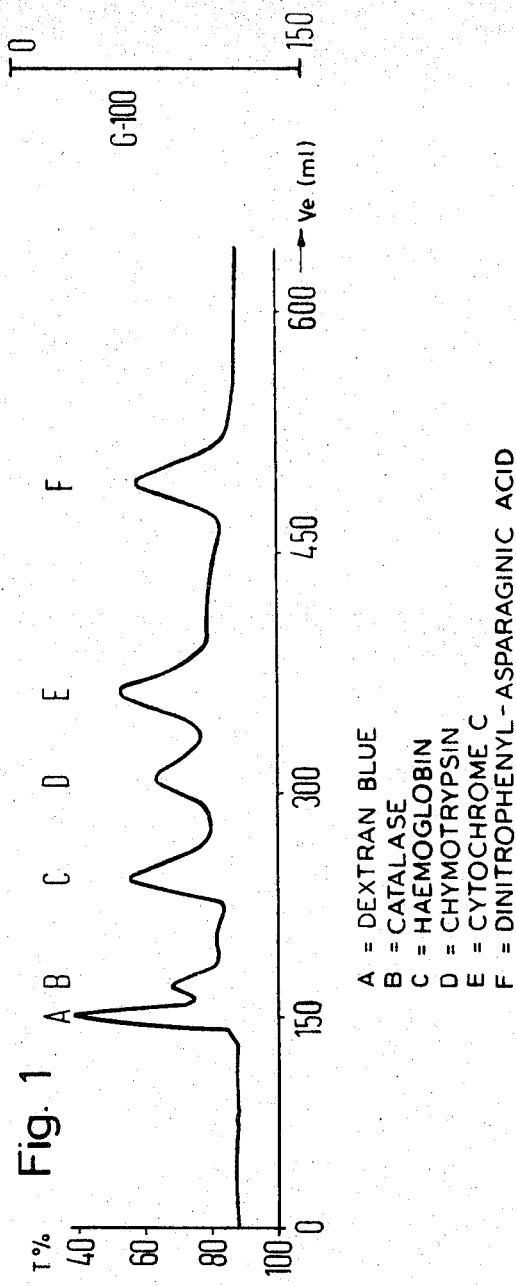
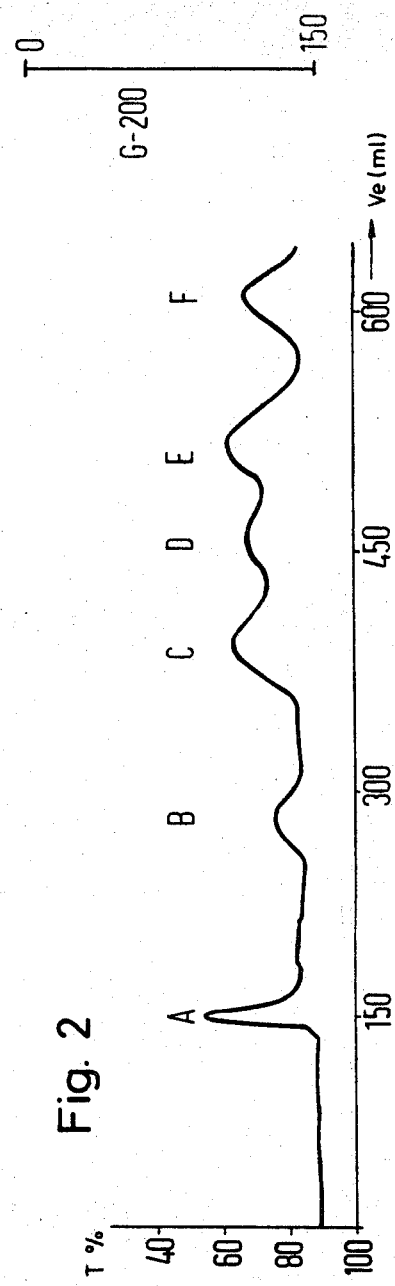
Fig. 1
Fig. 2
A = DEXTRAN BLUE
B = CATALASE
C = HAEMOGLOBIN
D = CHYMOTRYPSIN
E = CYTOCHROME C
F = DINITROPHENYL-ASPARAGINIC ACID

PROCESS FOR THE CHROMATOGRAPHIC SEPARATION OF MIXTURES

The present invention is concerned with a process for the chromatographic separation of substance mixtures with the use of molecular sieve materials and optionally of ion exchange materials.

Molecular sieve materials can be used to separate mixtures of substances of different molecular weights. The spatial reticulate structure of these gel-like molecular sieve materials contains hollow spaces into which the molecules can diffuse with varying rapidity, depending upon the molecular size. Substances with large molecular volumes cannot penetrate into the pores, whereas small molecules diffuse into the gel and, therefore, cover a longer path than the large molecules. The separation range of the molecular sieve materials is determined by the degree of cross-linking of the gel matrix and a separation of a mixture of substances only comes about when the pores of the gel are sufficiently large. Therefore, narrow limits are placed on gel chromatography by the fractionation range of the individual molecular sieve materials. Similar limits are also present with regard to the column dimensions because the very soft molecular sieve material is pressed together by the comparatively high hydrostatic pressure such as is present in columns of comparatively large dimensions so that not only the column permeability but also the separation effects is negatively influenced.

Substances can only be separated on ion exchangers when the charges are different. Therefore, in the case of substances of the same charge distribution, no separation of the substance mixture takes place by ion exchange chromatography, even when the individual components of the mixture have different molecular weights. Therefore, hitherto, in such cases, after the ion exchanger chromatography, a further chromatography had to be carried out in a molecular sieve column. This necessitated not only additional expenditure but, due to the necessity of at least twofold elution, also gave an undesired reduction of concentration which had again to be made good by evaporation and the like additional process steps.

The present invention overcomes these disadvantages of prior art procedures to a substantial extent.

The present invention comprises a process for the chromatographic separation of mixtures of substances using molecular sieve materials and optionally ion exchange materials, wherein at least two different materials suitable for chromatographic separation by molecular sieving and optionally by ion exchange are arranged directly behind one another, at least one anion and/or cation exchange material and/or molecular sieve material being followed by at least one molecular sieve material, the molecular sieve material with higher degree of cross-linking being provided above the molecular sieve material with a lower degree of cross-linking.

The different chromatographic materials used in the process according to the present invention are so arranged successively in the direction of flow of the substance mixture that eluate from one material passes directly to the chromatographic material downstream thereof. The various chromatographic materials are preferably arranged in a single column, the different chromatographic materials being separated by sieves or other porous materials. However, it is also possible to arrange the various chromatographic materials in several columns connected one behind the other, the empty volumes between two successive columns being kept so small that no substantial reduction of concentration of the eluted material takes place. This is, for example, possible by the provision of very narrow connection tubes with a total volume which is expediently smaller than the volume of liquid flowing within five minutes, preferably within 1 minute, through the column. However, the best results are obtained when there are no empty volumes between the individual chromatographic materials.

According to a preferred embodiment of the process according to the present invention, several molecular sieve materials with different degrees of cross-linking are placed in layers one above the other in one column, the different materials being arranged according to decreasing degree of cross-linking so that the lowermost layer in the column consists of the material with the lowest degree of cross-linking. In this way, it is possible to separate, in a single working step, substance mixtures which hitherto could only be separated from one another in a laborious manner with the use of several columns, a considerable dilution of the solutions of the mixture thereby having to be tolerated. Preferably, the individual layers of the column are separated from one another by porous intermediate layers, for example sieves, which are arranged within the column in such a way that they take up the weight of each gel layer lying thereabove.

The molecular sieve materials used are gel-like substances, most of which are based on cross-linked dextrans of which it was previously assumed that their properties are substantially influenced by hydrostatic pressure loading. Thus, it was generally taught that increasing the hydrostatic pressure considerably reduced the flow-through velocity. It was also assumed that, in the case of columns which are longer than 1 meter, considerable difficulties would arise. In the case of gels with an especially low degree of cross-linking, for example, Sephadex G-200 (a dextran cross-linked with epichlorohydrin) it was even prescribed that a level difference of 10 – 15 cm. should not be exceeded. Surprisingly, in the case of the use of the process according to the present invention, any desired high hydrostatic pressure can be maintained without the feared difficulties and the reduction of the flow-through velocities arising. Thus, we have found that, in the case of a gel bed, arranged according to the present invention, of 100 cm. height, which was subdivided by sieves into five layers each of 20 cm., in the case of a water pressure of 130 cm., only an insignificant reduction of the flow-through rate occured in comparison with a 20 cm. high gel bed in the case of the same hydrostatic pressure, whereas in the case of a non-subdivided arrangement of a 100 cm. high gel layer and 130 cm. water pressure, the flow-through rate dropped to one half.

For the process according to the present invention, there can be used the molecular sieve materials known for gel chromatography, most of which are dextrans cross-linked to a varying extent with, for example, epichlorohydrin (Sephadex). Other cross-linked dextrans are commercially available, for example, under the names Sepharose and Agarose. Apart from dextrans, there can also be used, for example, cross-linked polyamides and other substances based on long-chained molecules which are cross-linked with one another with the formation of soft, porous gels.

According to a further embodiment of the process according to the present invention, cation and/or anion exchangers and at least one molecular sieve materials are arranged directly one behind the other in this order. In the case of this embodiment, too, there again applies what is stated above regarding the successive order of various molecular sieve materials. The various material layers are preferably arranged one above the other in a single column and merely separated from one another by thin, porous carrier layers, especially by sieve inserts. Column segments have hereby proved to be particularly useful which can be combined with sieve segments.

The ion exchange materials constituting the uppermost layer can be cation exchanger or an anion exchanger. It is also possible to provide not only an anion but also a cation exchange material, these materials being either mixed or also in separate layers. Finally, it is also possible to use layers of cation or anion exchange materials of different ion strengths.

In the direction of the flow, a molecular sieve material follows the ion exchange material. This molecular sieve material can be in the form of a single layer but it can also consist of several layers with different degrees of cross-linking which then, as already stated above, are arranged in order of decreasing degree of cross-linking.

In the case of this embodiment of the process according to the present invention, it is possible to separate in the ion exchange material, substances with different ionic strengths. In the course of elution, substances of the same ionic strength, which are not separated in the ion exchange material, are then separated in the following molecular sieve material so that even difficult separation problems can now also be overcome in a simple manner to an extent hitherto not held to be possible, without an extensive apparative working being necessary.

In carrying out the process according to the present invention, there can be used not only gradient elution but also stepwise elution, these types of elution being known.

The given order of succession of the various chromatographic materials used, as well as the exclusion of intermediate spaces between the individual layers, is of importance for the process according to the present invention. Deviation from the given order of succession or the presence of substantial empty volumes between the individual material layers, results in the advantages of the process of the present invention no longer being achieved and substantial impairment of the separation results obtained. On the other hand, when working in the manner according to the process of the present invention, the number of theoretical plates is increased, the column dimensions are smaller, dilution is avoided and additional rechromatography is avoided. Therefore, the previously applicable limits for the chromatographic separation of substance mixtures are considerably extended by the manner of working according to the present invention.

The following Examples are given for the purpose of illustrating the present invention, reference thereby being made to the accompanying drawings which illustrate graphically the results obtained in the Examples:

FIGS. 1-5 represent the results of Example 1.

EXAMPLE 1.

A mixture containing 20 mg. each of dextran blue, catalase, haemoglobin, chymotrypsin, cytochrome C and phenylalanine in 1.2 ml. 0.05M phosphate buffer of pH 7.5 was applied to a column filled with a molecular sieve material based on dextran. The gel bed dimensions were 2 × 150 cm. The following experiments were carried out:

1. The gel bed consisted of a single layer (Sephadex G–100). The gel bed length used is regarded as the maximum and can practically not be further increased. Nevertheless, separation of dextran blue and catalase cannot be achieved, as can be seen from FIG. 1 of the accompanying drawings, in which concentrations of the individual substances are plotted against the eluted volumes. The elution was carried out with 0.05M phosphate buffer of pH 7.5.

2. There was used an identical column but with a molecular sieve material based on dextran with a lower degree of cross-linking (Sephadex G–200). In this case, a separation of dextran blue and catalase could be achieved but a satisfactory separation of haemoglobin, chymotrypsin and cytochrome C was not possible, as can be seen from FIG. 2 of the accompanying drawings.

Figure 3:
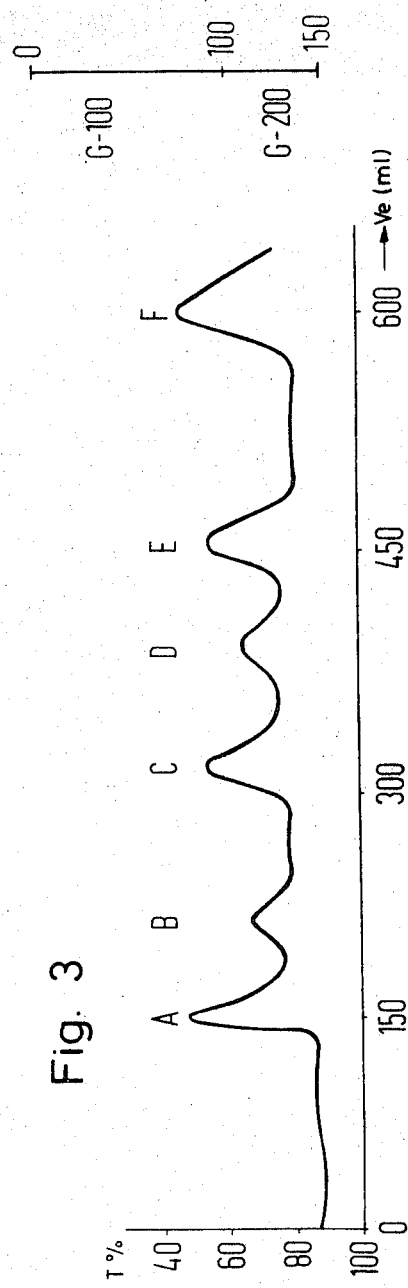

3. There are used a column which contained an upper 100 cm. layer of Sephadex with a comparatively high degree of cross-linking (Sephadex G–100) and a lower 50 cm. layer of Sephadex with a lower degree of cross-linking (Sephadex G–200). As FIG. 3 of the accompanying drawings shows, all the substances present in the test mixture were separated from one another.

The column used was a combination column with a screwed-in sieve.

Figure 4:
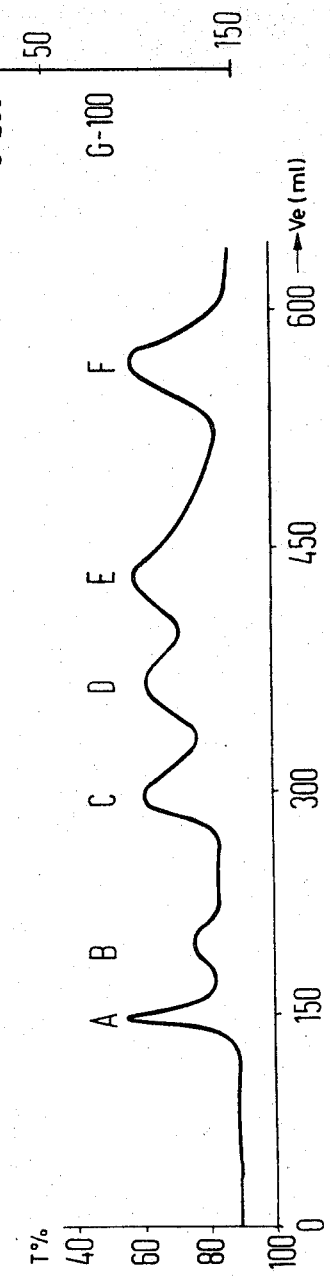

4. There was used the column described in 3 above but the order of succession of the two molecular sieve materials was reversed. As FIG. 4 of the accompanying drawings shows, a considerable dilution of the sample volume occurred and separation of the low molecular weight substances again did not take place (haemoglobin, chymotrypsin, cytochrome C indistinct).

5. There was used a column in which were arranged, one above the other, four molecular sieve materials, the degree of cross-linking of which decreased in the downward direction. The layer heights were as follows:

20 cm. (Sephadex G–25),
30 cm. (Sephadex G–50),
50 cm. (Sephadex G–100),
50 cm. (Sephadex G–200).

Figure 5:
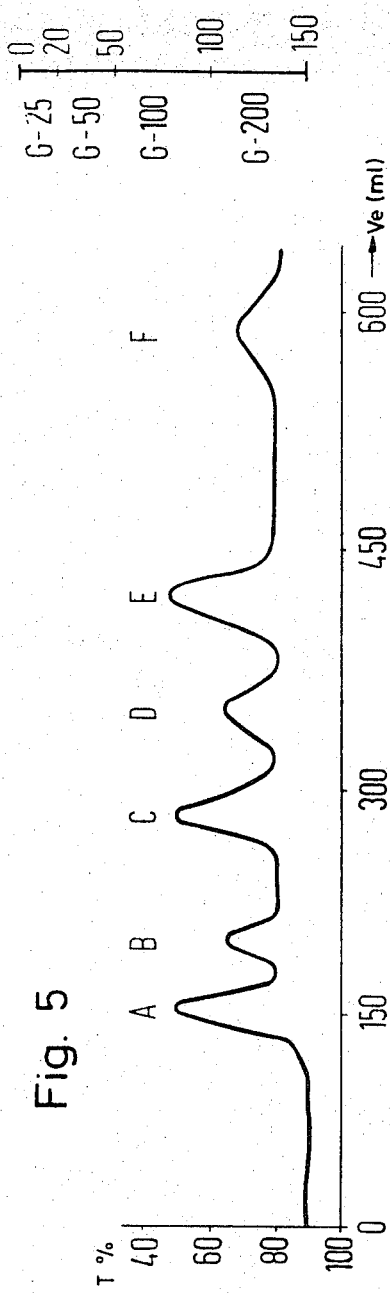

FIG. 5 of the accompanying drawings shows that a very good separation is achieved so that in the range between cytochrome C and phenylalanine, it would still be possible to separate a further three to four substances. The separation of catalase and haemoglobin is also so good that a further substance could be present therebetween or a gel bed of substantially smaller dimensions would suffer for the complete separation of the substances.

EXAMPLE 2.

Figure 6:
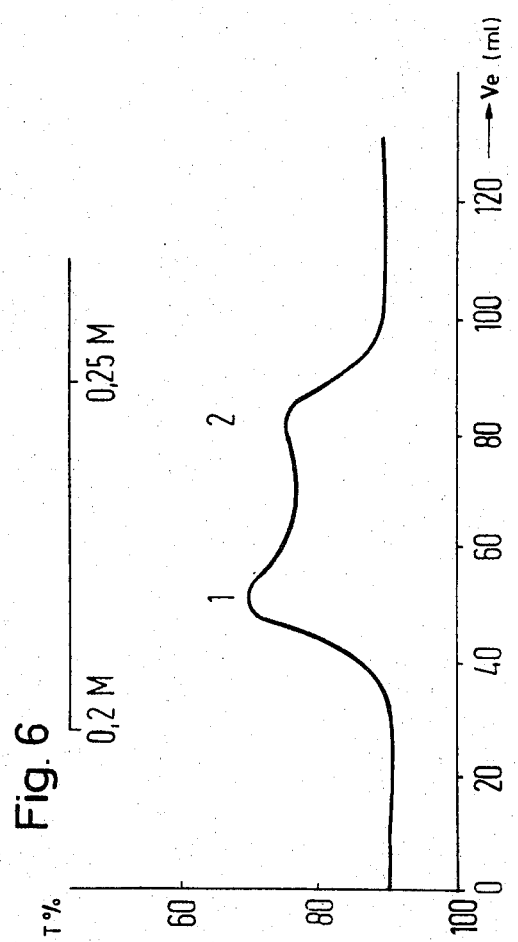
FIGS. 6 and 7 represent the results of Example 2.

A mixture containing 40 mg. each of catalase and ovalbumin, dissolved in 0.2M tris buffer of pH 7.6 was applied to an ion exchanger column (2 × 20 cm.; DEAE-Sephadex H 25) and eluted with a gradient of the same buffer. As FIG. 6 of the accompanying drawings shows, separation of the two substances did not occur.

Figure 7:
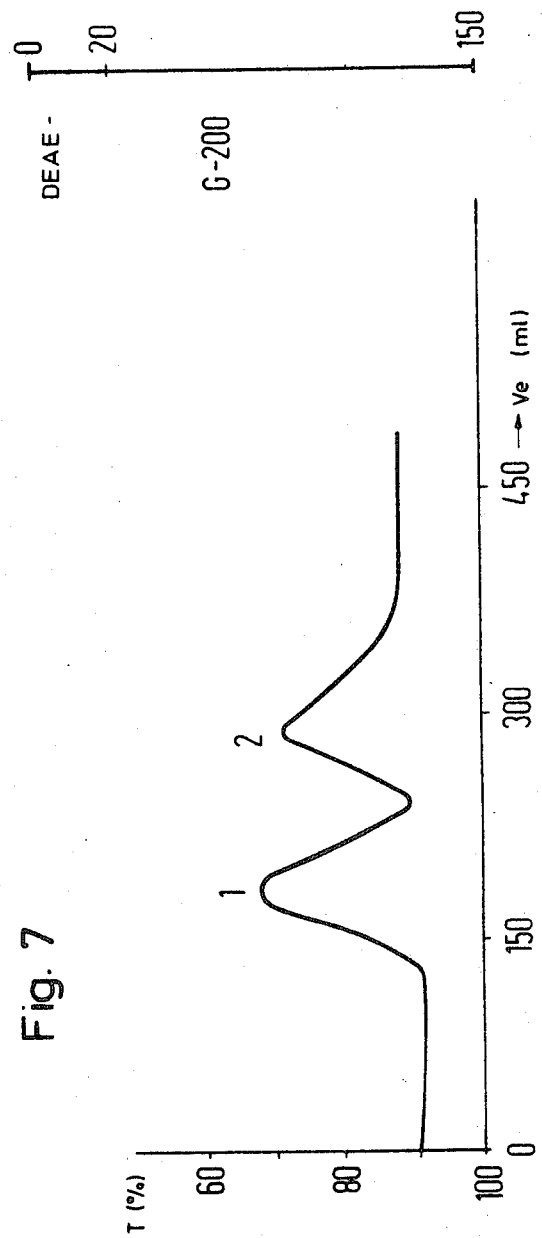

The above-described experiment was repeated but using a combined column in which, immediately following the ion exchanger, there was provided a layer of molecular sieve material (130 cm. of Sephadex G–200). Ion exchange material and molecular sieve material were separated, without a free space, by a sieve introduced into the column and fixed onto the column wall. As FIG. 7 of the accompanying drawings shows, in this way, a complete separation of the two substances was obtained.

It will be understood that the specification and examples are illustrative but not limitative of the present invention and that other embodiments with the spirit and scope of the invention will suggest themselves to those skilled in the art.

What is claimed is:

1. Process for the chromatographic separation of a liquid mixture of substances which process comprises sequentially contacting said mixture with contiguously disposed material layers comprising:
   a. a first material layer comprising at least one molecular sieve; and
   b. a second material layer comprising at least one molecular sieve
with the proviso that layer (a) is disposed above layer (b) and the molecular sieves in layer (a) have a higher degree of cross-linking than the molecular sieves of layer (b).

2. Process as claimed in claim 1 wherein the individual layers of material are separated by a thin porous material.

3. Process as claimed in claim 2 wherein said thin porous material is in the form of a sieve.

4. Process as claimed in claim 1 wherein the individual material layers (a) and (b) are arranged contiguously to one another and have substantially the same sectional surface area.

5. Process as claimed in claim 1 wherein all of said materials are disposed in a single column.

6. Process as claimed in claim 1 wherein layers (a) and (b) are separated by a thin porous membrane and have substantially the same sectional surface area.

7. Process as claimed in claim 6 wherein layers (a) and (b) are molecular sieves.

8. Process as claimed in claim 6 wherein layer (a) is an ion exchange material and layer (b) is a molecular sieve.

9. Process as claimed in claim 1 wherein said materials are a cross-linked dextrans.

10. Process as claimed in claim 1 wherein there is used a gradient or step-wise elution.

11. Process for the chromatographic separation of a liquid mixture of substances which process comprises sequentially contacting said mixture with contiguously disposed material layers comprising:
   a. a first material layer comprising at least one molecular sieve and an ion exchange material; and
   b. a second material layer comprising at least one molecular sieve material
wherein,
   in said layer (a), the molecular sieve constitutes a sub-layer and the ion exchange material constitutes a sub-layer disposed above the molecular sieve sub-layer; and
with the proviso that layer (a) is disposed above layer (b) and the molecular sieve material in layer (a) has a higher degree of cross-linking than the molecular sieve material in layer (b).

12. Process as claimed in claim 11 wherein said ion exchange material is a mixture of at least one cation exchange material and at least one anion exchange material.

13. Process for the chromatographic separation of a liquid mixture of substances which process comprises sequentially contacting said mixture with contiguously disposed material layers comprising:
   a. a first material layer comprising two molecular sieve material sub-layers wherein the molecular sieve material with a higher degree of cross-linking is disposed above the molecular sieve material with a lower degree of cross-linking; and
   b. a second material layer comprising at least one molecular sieve material;
with the proviso that layer (a) is disposed above layer (b) and the molecular sieve material of layer (b) has a lower degree of cross-linking than the lower most molecular sieve sub-layer of said layer (a).

* * * * *